(12) United States Patent
Merrill et al.

(10) Patent No.: US 9,743,013 B1
(45) Date of Patent: Aug. 22, 2017

(54) SECURITY SYSTEMS HAVING EVASIVE SENSORS

(71) Applicants: Charles Merrill, Cornelius, NC (US); Roger Allen Nolte, Concord, NC (US); Barclay J. Tullis, Palo Alto, CA (US)

(72) Inventors: Charles Merrill, Cornelius, NC (US); Roger Allen Nolte, Concord, NC (US); Barclay J. Tullis, Palo Alto, CA (US)

(73) Assignee: KONTEK INDUSTRIES, INC, Kannapolis, NC (US)

( * ) Notice: Subject to any disclaimer, the term of this patent is extended or adjusted under 35 U.S.C. 154(b) by 239 days.

(21) Appl. No.: 14/732,649

(22) Filed: Jun. 5, 2015

(51) Int. Cl.
*H04N 5/247* (2006.01)
*H04N 5/225* (2006.01)

(52) U.S. Cl.
CPC ............ *H04N 5/247* (2013.01); *H04N 5/2252* (2013.01)

(58) Field of Classification Search
None
See application file for complete search history.

(56) References Cited

U.S. PATENT DOCUMENTS

| | | | |
|---|---|---|---|
| 4,019,192 A | | 4/1977 | Miyagawa |
| 4,027,329 A | * | 5/1977 | Coutta ............... G07G 3/00 348/150 |
| 8,384,542 B1 | | 2/2013 | Merrill |
| 8,471,700 B1 | | 6/2013 | Merrill |
| 8,674,831 B1 | | 3/2014 | Merrill |
| 8,899,849 B2 | * | 12/2014 | Wada ................ G03B 17/561 396/427 |
| 9,179,105 B1 | | 11/2015 | Zeira et al. |
| 9,208,668 B1 | * | 12/2015 | Wu ....................... H04N 7/181 |
| 2004/0212677 A1 | * | 10/2004 | Uebbing ............... H04N 7/181 348/155 |

(Continued)

FOREIGN PATENT DOCUMENTS

JP    2005-210263    8/2005

OTHER PUBLICATIONS

Expired U.S. Appl. No. 61/325,157, filed Apr. 16, 2010 by Charles Merrill, Kevin Charles Kriegel, Allen Roger Nolte, Barclay J. Tullis and titled "Security Systems Having Armored, Sensory, Adaptive, Stealthy, and/or Autonomous Means".

(Continued)

*Primary Examiner* — W B Perkey
(74) *Attorney, Agent, or Firm* — Barclay J. Tullis (57) ABSTRACT

Networks of cameras and/or other sensors enable a sensor monitoring system or other computer system to control hiding devices used to enable the cameras and/or other sensors to evade danger by hiding or being disguised. Detection and/or determination of potential danger is garnered from data, from some of the cameras and/or sensors, that they or other of the cameras and/or sensors may be facing eminent danger of discovery, manipulation, alteration, deactivation, and/or damage. The hiding devices are caused to hide or disguise the sensors and/or cameras that appear to be in danger. Hiding or disguising can continue for at least a finite duration of time, or until indication of danger is gone. Some of the cameras and/or other sensors, and their associated hiding devices, can be turned off or made to sleep for periods of time until at least awaken by time-out events or by events indicating a need to do so.

20 Claims, 3 Drawing Sheets

(56) References Cited

U.S. PATENT DOCUMENTS

| | | | |
|---|---|---|---|
| 2007/0039030 A1* | 2/2007 | Romanowich | G08B 13/19608 725/105 |
| 2008/0316312 A1 | 12/2008 | Castillo et al. | |
| 2009/0185036 A1 | 7/2009 | Bowron | |
| 2011/0261205 A1* | 10/2011 | Sun | G03B 3/10 348/159 |
| 2016/0105598 A1* | 4/2016 | Zeira | H04N 5/23203 348/143 |
| 2016/0309095 A1* | 10/2016 | Laroia | H04N 5/247 |
| 2016/0335501 A1* | 11/2016 | Huang | G06K 9/00771 |
| 2017/0075196 A1* | 3/2017 | Cury | G03B 17/04 |

OTHER PUBLICATIONS

Pending U.S. Appl. No. 12/877,754, filed Sep. 8, 2010 by Charles Merrill, Kevin Charles Kriegel, Allen Roger Nolte, Barclay J. Tullis and titled "Diversity Networks and Methods for Secure Communications".

Pending U.S. Appl. No. 14/729,056, filed Jun. 3, 2015 by Charles Merrill, Allen Roger Nolte, Barclay J. Tullis and initially titled "Diversity Networks and Methods for Secure Communications", with title later changed by Preliminary Amendment to "Security Systems with Pop-out Cameras".

* cited by examiner

SECURITY SYSTEMS HAVING EVASIVE SENSORS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

The invention(s) relates(relate) to networks of cameras and/or other sensors that effectively cooperate with one another to use hiding devices to hide or disguise in order to evade discovery, manipulation, alteration, deactivation, and/or damage by unapproved persons or agents. And after hiding or being hidden, these cameras and/or other sensors can use the hiding devices to come out of hiding or out of disguise. These networks may also include other supporting devices that aid the cameras and/or other sensors, devices such as illuminators and/or sound generators (e.g. loudspeakers).

Description of the Related Art

U.S. patent application Ser. No. 12/877,754 on "Diversity Networks and Methods for Secure Communications" filed Sep. 8, 2010 by Merrill et al. discloses sensor networks that use a variety of communications media, paths, and communications technologies to avoid disruption or detection of their signals and messages. And U.S. patent application Ser. No. 14/279,056 on "Security System with Pop-out Cameras" filed Jun. 3, 2015 by Merrill et al. discloses systems that include cameras that can hide or pop-out from hiding within a hole at times that cannot be predicted by unauthorized persons. But more needs to be done, and can be done, to protect networks of sensors from evil-doers. The disclosures of both of these patent applications are incorporated herein in their entirety. Also in the prior art, it is known to disguise or hide cameras and/or other sensors in a passive sense as by fixed design or placement.

BRIEF SUMMARY OF THE INVENTION

The invention(s) is(are) pointed out with particularity in the appended claims. However, some aspects of the invention(s) are summarized in the following descriptions of some implementation examples and aspects. See the first paragraph below under the section titled "Detailed Description of the Invention" for some important word and term definitions applicable to this disclosure and the claims.

The current invention(s) improves(improve) the survivability of networks of sensors by providing hiding devices that are active and dynamic in situ to hide or disguise endangered sensors during periods when they appear to be threatened with harm by one or more human attackers, and hiding them in a manner that is automatic and reversible, and particularly in response to real-time sensor data. Exemplary implementations of the invention(s) include security systems that each comprise: a) multiple cameras comprising at least a first camera and a second camera; b) a sensor monitoring system in communication with at least the first camera and the second camera, and configured to detect, using at least one image from at least the second camera, a potential security or safety threat to at least the first camera); c) a first hiding device in communication with the sensor monitoring system; and d) a first hiding structure in proximity to the first camera and comprising at least a portion of one of the group consisting of a natural object, a building, a hole in a wall, an item of building material, an item of statuary, a landscaping feature, and a decorative ornament; wherein the sensor monitoring system is configured to direct the first hiding device to hide or disguise the first camera from the threat by moving the first camera and/or the first hiding structure in relation one to the other in response to the threat. Each of these security systems can further comprise at least a sensor that is not a camera and that is in communication with the sensor monitoring system; wherein the sensor is configured to send a signal to the sensor monitoring system when the sensor senses a condition indicative of a potential security or safety threat; and wherein the first hiding device and first hiding structure are configured to expose or hide the first camera in response at least in part to the signal. The first hiding device can be configured to move the first camera at least some of the time to at least a first position that at least momentarily hides the first camera from the detected potential security or safety threat, and/or it can be configured to move the first hiding structure at least some of the time to a second position that at least momentarily hides the first camera from the detected potential security or safety threat. The first hiding device can be configured to hide the first camera for a particular random duration of time, and/or it can be configured to expose the first camera for a particular random duration of time. The first hiding device can be configured to hide the first camera at least some of the time that the sensor monitoring system determines a potential security or safety threat is being viewed by at least one of the first camera and the second camera. Each of the security systems can further comprise a second hiding device and a second hiding structure, wherein the sensor monitoring system is further configured to direct the second hiding device to hide the second camera by moving the second camera and/or the second hiding structure in relation one to the other in response to another detected potential security or safety threat. The first hiding structure can comprise one or more objects not commonly related to cameras. Each of the security systems can include a reporting device that can be a visual display device, an audible emission device, a textual output device, and/or an alarm device.

Other exemplary implementations of the invention(s) can comprise a collection of at least a first camera and a second camera in communication with one another; wherein each of the first camera and the second camera is configured to detect one or more potential security or safety threats within its respective field-of-view; wherein each of the first camera and the second camera comprises a respective hiding device that can move that respective camera relative to an associated hiding structure; and wherein the first camera is configured to use its respective hiding device to hide that first camera behind its associated hiding structure whenever the second camera detects a first potential security or safety threat to the first camera. The second camera can be configured to pan or sweep in a manner that will at least some of the time cause its field-of-view to include the first camera. At least one additional sensor in communication with at least the first camera can be included; wherein the additional sensor is configured to detect a second potential security or safety threat to the first camera and to send a signal to the first camera when the second potential security or safety threat is detected; and wherein the first camera is configured to hide after it receives that signal from the additional sensor.

These and other exemplary implementations of the invention(s) can include a method of protecting cameras. One such method comprises: a) providing a sensor monitoring system communicatively connected to at least two cameras and to at least two respective moving devices, wherein the sensor monitoring system is able to detect potential security or safety threats to one or more of the at least two cameras based on images communicated to it from one or more of the at least two cameras, and wherein the sensor monitoring system is able to cause the at least two moving devices to move their respective cameras to hide and/or disguise those respective cameras from one or more of the threats; and b) positioning at least one hiding structure to be adjacent to each of the at least two cameras such that the one hiding structure is used for hiding at least one of the two cameras. The method can also include setting up the two cameras such that their fields-of-view overlap at least in part at least some of the time. In some embodiments of the method, at least some times when at least one of the at least two cameras is moved to a hiding position, it can be caused to remain in that hiding position for a particular random duration of time. In some embodiments of the method, at least some times when at least one of the at least two cameras is moved out of a hiding position, it can be caused to remain out of that hiding position for a particular random duration of time. Each of the at least two cameras can be made capable of detecting one or more objects or motions within its respective field-of-view that represent one or more of the potential security or safety threats that might lead to one or more sensors being harmed or put out of working order. And in these methods, a sensor monitoring system can use images or video streams from at least one of the two cameras and/or other sensors to detect objects or motions that represent one or more potential security or safety threats. These methods can further include: a) providing a reporting device communicatively connected to the sensor monitoring system; and b) reporting on the reporting device information indicative of one or more potential security or safety threats against at least one of the at least two cameras.

Objects and Advantages of the Invention

Objects and advantages of the present invention(s) are numerous. One object and advantage is that of a security system capable of protecting by hiding and/or disguising potentially vulnerable sensors from imminent attack by an intruder. Another is that of having sensors aid in assisting one another to improve their sensing performance and durability. Another is to capture candid images as by surprise.

The various features and further advantages of the present invention(s) and its preferred embodiments will become apparent to ones skilled in the art upon examination of the accompanying drawings and the following detailed description of exemplary implementations. It is intended that any additional advantages be incorporated herein. The contents of the following description and of the drawings are set forth as examples only and should not be understood to represent limitations upon the scope of the present invention(s).

BRIEF DESCRIPTION OF THE SEVERAL VIEWS OF THE DRAWINGS

The foregoing objects and advantages of the present invention(s) may be more readily understood by one skilled in the art with reference being had to the following detailed description of several embodiments thereof, taken in conjunction with the accompanying drawings. Within these drawings, callouts using like reference numerals refer to like elements in the several figures (also called views) where doing so won't add confusion. Within these drawings.

DETAILED DESCRIPTION OF THE INVENTION

The following is a detailed description of the invention(s) and its preferred embodiments as illustrated in the drawings. While the invention(s) will be described in connection with these drawings, there is no intent to limit it to the embodiment or embodiments disclosed. On the contrary, the intent is to cover all alternatives, modifications and equivalents included within the spirit and scope of the invention(s) as defined by the appended claims. However, within this disclosure and the claims which follow, the following terms are given the following particular meanings: 1) the term "camera" is defined to mean an optical and electronic device (or system) that senses images and converts them into digital signals, and wherein a stereo camera is considered a single camera; 2) the term "hiding structure" is defined to mean a semi-transparent or opaque physical object or portion thereof that can block or otherwise at least obscure a person's clearly viewing at least a portion of a given sensor (which may be a camera) located at some position in proximity to that hiding structure, examples including a part of a building or manmade structure, a decorative object, a mechanism, a cover, a container, a housing, and even a natural object such as a rock, tree, bush or shrub; 3) the term "hiding" is defined to mean a form of evading, such as moving or being moved out of view, or using a disguise; 4) the term "hiding device" is defined to mean a device that can facilitate hiding and/or un-hiding; 5) the term "sensor monitoring system" is defined to mean any electronic system that can monitor data or information from sensors and/or that can monitor conditions of sensors (some of which may be cameras), that may include a human interface, that may control sensors and/or hiding devices, and that may include at least one override ability to enable an operator to override behavior that may otherwise be automatic behavior; and 6) the term "manual override" is defined to mean any human operator action taken to alter a normally automatic action of a system or sub-system whether hands are involved or not.

Embodiments of the present invention(s) use one or more cameras to capture images and analyze them for indications of mischievous or unwanted behaviors of objects and/or humans in sensory range of these embodiments. Embodiments of the present invention(s) can be enhanced by also using non-imaging sensors (and/or sensor systems) of any kind, such as radar, infra-red motion sensors, seismic sensors, microphones, wireless receivers, light sensors, contact sensors, force sensors, weight sensors, strain sensors, and disturbance sensors. These non-imaging sensors can be designed into the embodiments to sense such activities as a lamp turning on or off, a door or window opening or closing, footsteps, and/or an engine or motor running, starting up, or stopping. And non-imaging sensors can be used to sense gunshots, destructive noises, fire, smoke, water running, voices, laughter, screaming, animal sounds, alarm sounds, glass breaking, prying sounds, drilling sounds, sawing sounds, crashing sounds, digging, crunching, chopping, grinding, bumping, vibration, shaking, shock, and sudden temperature changes. Information garnered from sensors is used by the systems of these embodiments to not only draw attention and perhaps record activities (e.g. sensor data), but also to inform and enable the systems to automatically hide sensors that appear otherwise to be in danger of unwanted discovery, manipulation, alteration, or damage. The systems of these embodiments can also record data obtained by the sensors, including time lapse camera images and/or video, and time lapse sensor data in general.

Figure 1:
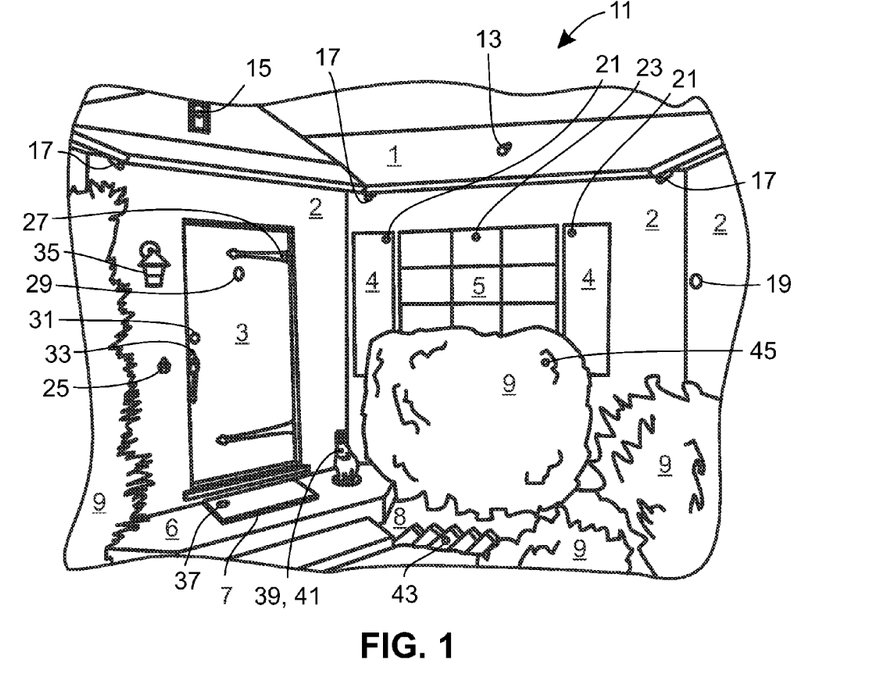
FIG. 1 shows a front perspective view of a portion of a house wherein multiple cameras and other sensors are located to observe and/or otherwise sense and enable responses to objects approaching a front door, and to other potential events occurring in the vicinity of the front door.

FIG. 1 shows a front perspective view of a portion of a house 11 wherein multiple sensors 13, 15, 17, 19, 21, 23, 25, 27, 29, 31, 33, 35, 37, 39, 43, and 45 are located to observe and/or otherwise sense and enable responses to objects approaching a front door 3, and to other potential events occurring in the vicinity of the front door 3. Illustrated portions of the house 11 include its roof 1, walls 2, door 3, shutters 4, windows 5, and porch 6. Also shown are a door mat 7, ground surface 8, and bushes 9. An ornamental rabbit FIG. 41 is shown located on the porch 6, and the rabbit FIG. 41 has a sensor 39 located in one of its eye locations. The sensor 43 is shown located in a brick of a row of bricks serving as a boarder trim along the ground 8. Any of the sensors 13, 15, 17, 19, 21, 23, 25, 27, 29, 31, 33, 35, 37, 39, 43, and 45 can be a camera, a sensor that is non-imaging, or a combination of a camera and a non-imaging sensor. Note that the sensor 13 is installed on the roof 1, the sensor 15 is installed in a Gable vent, the three instances of sensors 17 are installed under the eaves of the roof 1, the sensor 19 is installed in a wall 2, the two sensors 21 are installed in the shutters 4, the sensor 23 is located in front of or behind a window 5, the sensor 25 is part of a doorbell, the sensor 27 is part of trim on the door 3, the sensor 29 is in the door 1, the sensor 31 is part of a door lock, the sensor 33 is part of the door handle or door latch, the sensor 35 is part of a lamp fixture by the door 1, the sensor 37 is in the door mat 7, the sensor 39 is part of the rabbit 41, the sensor 43 is in a brick on the ground 8, and the sensor 45 is in one of the bushes 9. All of these sensors 13, 15, 17, 19, 21, 23, 25, 27, 29, 31, 33, 35, 37, 39, 43, and 45 are located, in this illustrated example, within a vicinity of the door 3 and windows 5 enabling them to aid in detecting motions and other activities in that same vicinity. That vicinity in this example embodiment might be defined as the outdoor region within 20 meters of the door 3 or windows 5. But in other embodiments of the present invention(s) and for other applications, such as along a security fence, the vicinity that the sensors would protect may for example extend 50 meters to either side of the fence and along the entire length of the fence, plus 50 meters beyond the ends of the fence if it has ends.

Figure 2:
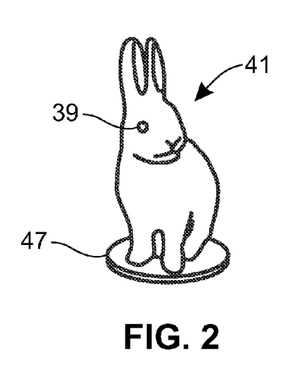
FIG. 2 shows a front perspective view of an ornamental concrete rabbit configured with a camera as one of its eyes, with possibly other sensors such as for hearing, and positioned on a pedestal that can be rotated remotely.

FIG. 2 shows a front perspective view of an ornamental concrete rabbit 41 configured with a camera 39 as one of its eyes, with possibly other sensors such as a microphone (not shown, as part of the camera 39, or substituted for the camera 39) for hearing, and positioned on a pedestal 47 that can be rotated by remote control in some embodiments of the present invention(s). Rotation of the pedestal 47 can give the camera 39 the ability to pan across a scene, and even rotate away from the scene to in effect hide the camera 39 or substitute sensor. The pedestal 47 can be considered an example of a hiding device. Such an object as this rabbit 41, configured with sensors such as the camera 39, can be located, for example, on the porch 6 of a house 11 as shown in FIG. 1, or it could be located in a garden and perhaps partially hidden from view. The pedestal 47 could be used to rotate the rabbit 41 to face outward to direct the camera 39 toward a field-of-view that takes in the porch 6 and vicinity outside the door 3. In other embodiments of the present invention(s), the rabbit 41 or other ornamental objects can be located under a bush, shrub, or other planting where it would be less noticeable than on a porch.

Figures 3, 4:
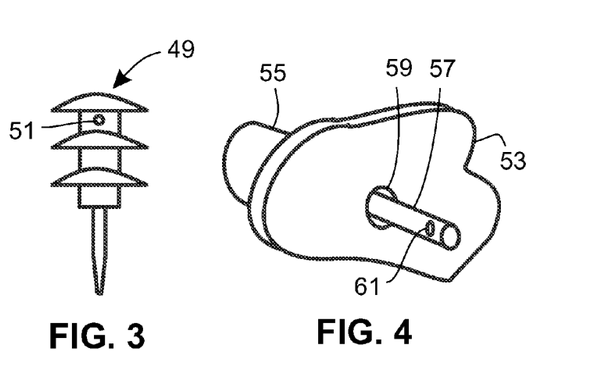
FIG. 3 shows a lantern fixture as used along a walkway or as part of landscaping features, wherein a camera is located within or on the fixture.
FIG. 4 shows a perspective view of a camera assembly comprising a camera housed within a cylindrical enclosure that can be automatically moved in and out of a hole in a wall to hide or not.

FIG. 3 shows a lantern fixture 49 locatable along a walkway or as part of landscaping features, wherein a camera 51 is located within or on the fixture 49, in this case a lantern on a ground stake. As with the rabbit 41 shown in FIG. 2, the fixture 49 can hold other sensors than a camera, and the lantern 49 can be located in any location one would put a ground lantern. Placing such a lantern 49 along a walkway in some embodiments of the present invention(s) would enable a vibration sensor or microphone held by the lantern to respond to nearby footsteps, objects passing along the walkway, or other activity along the walkway.

FIG. 4 shows a perspective view of a camera assembly (or other sensor assembly) comprising a camera 61 (or other sensor) housed within a cylindrical enclosure 57 that can be automatically moved in and out of a hole 59 in a wall 53 to hide or not. In some embodiments of the present invention(s), such a camera assembly (or other sensor assembly) can include an actuator 55 hidden behind the wall (or within the wall) with which to stick the camera 61 or other sensor out of the hole 59, or to pull it back in again to hide it out-of-view of someone outside the wall 53. The illustrated arrangement of parts (the actuator 55 and the cylinder 57) constitutes a hiding device for the camera 61 (or other sensor substituted in place of the camera 61).

Figure 5:
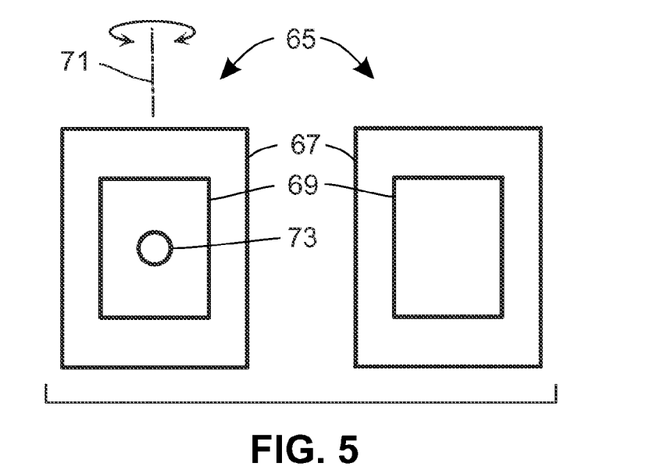
FIG. 5 shows both a frontal view of a frame supporting a camera within an enclosure having a vertical axis for rotation, wherein the camera can be rotated about that axis to pan its field-of-view from the front of the frame to the rear of the frame and vice-versa.

FIG. 5 shows both a frontal view of a frame 67 supporting a camera 73 within an enclosure 69 that has a vertical axis for rotation 71, wherein the camera 73 can be rotated about that axis 71 to pan its field-of-view across the space in front of the frame 67, and from the front of the frame to the rear of the frame and vice-versa. In the view on the left hand side, the camera 73 is looking outward from the front of the frame 67 toward the viewer of the figure; while on the right hand side, the camera 73 is hiding from the viewer of the figure by looking behind the frame 67 and away from the viewer. In some embodiments of the present invention(s), the rotatable enclosure 69 can be considered a hiding structure and can be useful to locate the camera 73 (or other possibly fragile sensor) as part of a wall, door, or enclosure surface.

Figure 6:
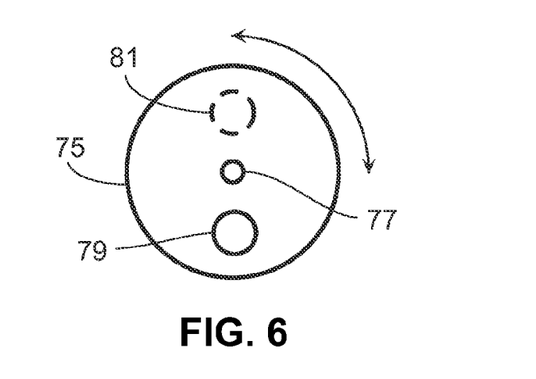
FIG. 6 shows a frontal view of a rotatable disc, rotatable from positions that cover the aperture of a camera positioned behind the disc to a position that uncovers the aperture allowing the camera a clear view through the disc.

FIG. 6 shows a frontal view of a hiding structure that comprises a rotatable disc 75, rotatable from positions wherein the disc 75 covers an aperture 81 of a camera (camera not shown) positioned behind the disc 75, to a position that uncovers the aperture 81 in order to allow the camera a clear view through a hole 79 in the disc 75.

Figure 7:
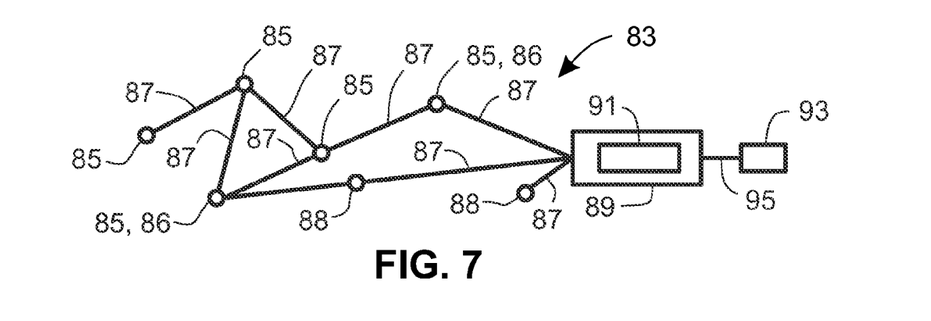
FIG. 7 shows a diagram of a network of sensors communicably connected to a sensor monitoring system that is communicatively connected to both an alarm device and a reporting display device.

FIG. 7 shows a diagram of a network 83 of sensors 85 communicably connected to a sensor monitoring system 89 that is communicatively connected to both an alarm device 93 and a reporting display device 91. The communication connection between the sensor monitoring system 89 and the alarm device is shown as connection 95. As an illustration of some embodiments of the present invention(s), this diagram shows five sensors 85 interconnected by connections 87 and connected to the sensor monitoring system 89, but other embodiments could comprise many more sensors and in a bigger network. These connections 87 and 95 can use any of a variety of communication means, such as wireless and/or wired connections for example, and can communicate using any communications technology, such as Ethernet and/or RS-485 for example. Within the network 83 of sensors 85, for example, the nodes of the network 83 which are here represented as sensors 85 can be co-located with hiding devices 86 controlled for example over the same network (or other network) from and by the sensor monitoring system 89. In some embodiments of the present invention(s), similarly co-located hiding devices 86 could be controlled by sensor subsystems having a more local presence with the sensors to control at least some of the hiding devices. And in some of the embodiments, other supporting devices 88 can be included, such as illuminators for calibrating or otherwise aiding the cameras or for warding off an intruder, and/or sound generators for sound sensor calibration or for distracting or otherwise warding off an intruder.

Figure 8:
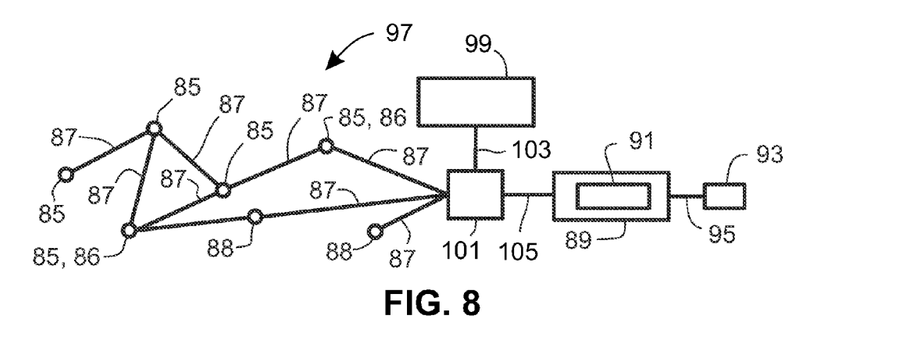
FIG. 8 shows a diagram of a network of sensors communicably connected to a sensor monitoring system that is communicatively connected to both an alarm device and a reporting display device, wherein the network and monitoring system are interconnected by way of a routing device that is connected also to a computer.

FIG. 8 shows a diagram of a network 97 of sensors 85 communicably connected to a sensor monitoring system 89 that is communicatively connected to both an alarm device 93 and a reporting display device 91, wherein the network 97 and sensor monitoring system 89 are interconnected by way of a routing device 101 that is connected also to a computer 99. The difference between what is shown in FIG. 8 compared to what is shown in FIG. 7 is the addition of the computer 99 and the routing device 101. In this example of a possible embodiment of the present invention(s), the computer 99, rather than the sensor monitoring system 89, can be the source of remote control over hiding devices 86 used throughout the network 97 to hide at least some of the sensors 85, and to control other supporting devices 88. The computer 99, rather than the sensor monitoring system 89, can also be the recorder of sensor data from the sensors 85. However, one skilled in the art will find obvious many alternative arrangements for grouping and interconnecting these and other subsystems to execute needed monitoring, recording, reporting, alarming, and control functions; and these alternative embodiments are intended to be incorporated within the present disclosure.

Figure 9:
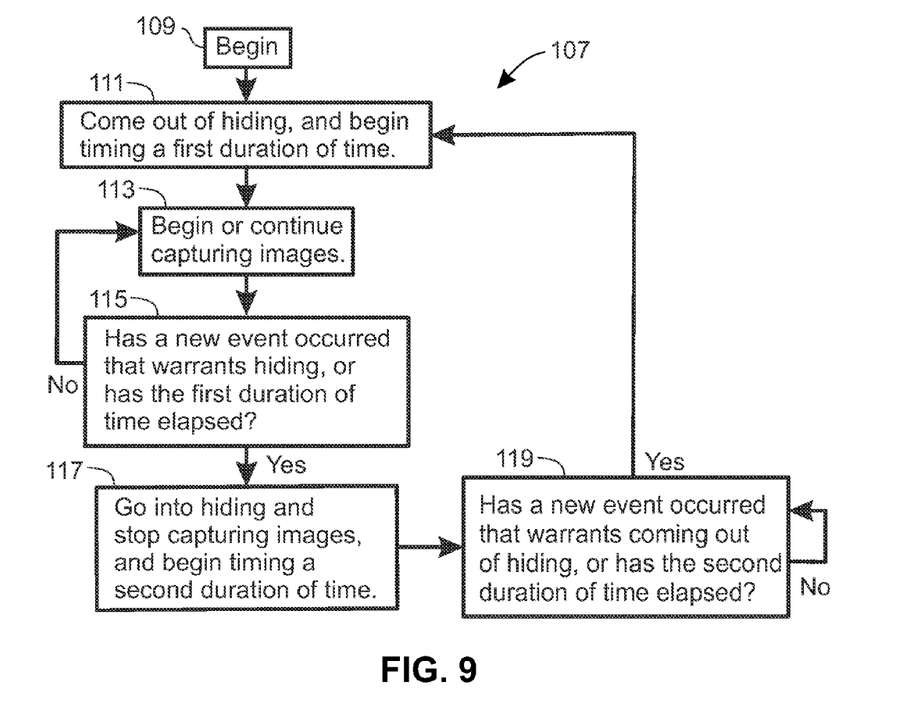
FIG. 9 shows a flow chart illustrating an example of a method that can be used with embodiments of the invention(s).

Embodiments of the present invention(s) include methods of using sensor networks along with hiding devices and other supportive devices. In FIG. 9, one such method of hiding and un-hiding a camera is illustrated in a flow chart 107. One skilled in the art will know how this method can be expanded or duplicated in order to handle more than a single camera (or other sensors). Examples of events that would warrant hiding a particular sensor can include the detection by that particular sensor and/or other sensors of nearby disturbances which might correlate with unwanted activity by one or more objects or persons in the vicinity of the particular sensor that might represent a precursor to the particular sensor becoming damaged by vandalism, for example. Sensors can also be hidden if there is no direct cause for them to be actively sensing. Examples of events that would warrant un-hiding a particular sensor can include a need for being alert and actively sensing at least once in a while, or a need for being alert while there is no indication from the particular sensor and/or nearby sensors of a threat to the particular sensor. In the flowchart 107, events are detected by the sensors in a sensor network, and hiding devices respond to those and other events. The other events are time-out events from timers set for particular durations which may be of random duration. That method begins at step 109 followed by step 111 which brings the camera out of hiding and begins timing a first duration of time. Step 113 follows in which the camera begins or continues capturing images. Step 115 follows step 113 and continues to query if a new event has occurred that warrants hiding the camera, or whether the first duration of time has elapsed, or of waiting for an interrupt (not shown) that signals that a new event has occurred or elapse of the first duration has occurred. If neither such a new event nor elapse of time has occurred, then the camera continues to capture images in step 113 and querying in step 115. But if either such a new event or elapse of time occurs, then step 117 follows step 115 to hide the camera and stop capturing images, and to begin timing a second duration of time which may be of random duration. Step 119 follows step 117 by querying whether a newer event has occurred that warrants bringing the camera out of hiding, or whether the second duration of time has elapsed. If neither has yet occurred, then step 119 continues is querying and waiting. But if at least one has occurred, then the method returns from step 119 to step 111. This is merely one example embodiment of a method that can be used in embodiments of the present invention(s). In another example embodiment, the method just described could be used but without one or both of the time durations being used, such that taking a sensor into hiding and/or bringing it out of hiding is initiated only by events detected using un-hidden sensors, or by events otherwise generated by a sensor monitoring system or computer. One skilled in the art can readily envision additional and/or alternative methods to use in embodiments of the present invention(s).

Embodiments of the present invention(s) include devices and methods to hide and/or disguise sensors to protect them from discovery, manipulation, alteration, deactivation, or damage. One example would be a camera that can become protected within a protected space if indications of a menacing situation are detected from its captured images, or detected from data from other sensors that could indicate the camera may be in danger. The protected space could be, for example, a hole into which the camera can be withdrawn, or a clam-shell container that can be made to close over the camera, or a corner of a building behind which the camera could be moved to hide either on one side or the other. An example of disguise would be if the camera can be flipped around to display itself as anything other than a camera, such as a decorative architectural feature. An example of a menacing situation would be that of the face and/or hand of a person moving directly toward the camera. Within some embodiments of the present invention(s), the hiding of a first sensor might trigger the un-hiding of one or more other sensors, in particular to not lose the opportunity to capture records of the activity that initiated the hiding of the first sensor. Within some embodiments of the present invention(s), a camera that is in hiding could be brought out of hiding in response to activity sensed by another sensor; for example a disturbance to the door latch 33 could trigger one of the cameras such as cameras 29 or 35 to come quickly out of hiding and capture candid images of what might be causing the disturbance.

As said above, in some embodiments of the present invention(s), detection and/or determination of potential danger is garnered from data from at least some of the cameras and/or sensors that they or other of the cameras and/or sensors may be facing eminent danger of discovery, manipulation, alteration, deactivation, and/or damage. In some of those embodiments, the hiding devices are caused to hide or disguise the sensors and/or cameras (and perhaps even other supporting devices) that appear to be in danger. Hiding or disguising can continue for at least a finite duration of time, or until indication of danger is gone. But also, some of the cameras and/or other sensors, and their associated hiding devices, and even other supporting devices, can be turned off or made to sleep for periods of time until at least awaken by time-out events or by events indicating a need for turning fully back on.

In some embodiments of the present invention(s), cameras and/or other sensors, and possibly also supporting devices, are adjusted either manually or automatically as a function of what other cameras and/or other sensors sense, and in particular when sensors detect what may be suspicious disturbances. Examples of what might be adjusted for a camera include pan angle(s), pitch angle(s), zoom, focus, sensitivity, aperture setting, frame-rate, storage rate, location, nominal direction of its optical axis, and extension from a hiding place. Examples of adjustments for other than cameras include the turning on and off of illumination devices, adjusting the direction of a spotlight, adjusting the sensitivity of microphones, adjusting the pointing directions of directional microphones, and adjusting the volumes of sound generators such as speakers. Even recorder settings can be adjusted manually or automatically in response to sensor data and/or sensor signal levels. Importantly, embodiments of the invention(s) include configurable choices and adjustments of how sensors and supporting devices (and hiding devices) should respond to data being generated by other sensors. Examples of such configurations and adjustments include those of whether an illumination device should be turned on when a door latch sensor is disturbed, whether a hiding device should hide its associated camera for a moment after an explosive sound is detected by a microphone and for how long, and whether the sensitivity of a second camera seeing low contrast images should be increased while a first camera is receiving images that are of good contrast and showing some motion activity within its field of view that overlaps the field of view of the second camera.

In some embodiments of the present invention(s), the normal operation of sensors and of hiding devices can be overridden by manual control or computerized control, as for example remotely from a sensor monitoring system 89 or computer 99 in communication with the network of sensors. Also, there may be incorporated multiple levels of priority for overriding cameras and/or hiding devices. For example, if a particular sensor detects actionable activity that would normally trigger a hiding device to hide a particular camera, the programmed response of a hiding device can be blocked by manual or automatic override, but if a particular other sensor detects non-actionable activity, that hiding device may still be able to hide that particular camera.

Although specific embodiments of the invention(s) have been illustrated and described herein, those of ordinary skill in the art will appreciate that any arrangement configured to achieve the same purpose may be substituted for the specific embodiments shown. This disclosure is intended to cover any and all adaptations or variations of various embodiments of the invention. It is to be understood that the above description has been made in an illustrative fashion, and not a restrictive one. For example, the cameras can individually include any form of imaging array, may include selectable lenses, may utilize zoom lenses, and may be packaged with computational means for image analytics. One skilled in the art can also readily understand how to include additional features to cameras and other sensors to make them simply and conveniently interface or couple with one or more hiding devices. The networks of sensors can be configured in any form of network architecture, such as a "star" configuration, a "ring" configuration, or a "mesh" configuration. Combinations of the above embodiments, and other embodiments not specifically described herein will be apparent to those of skill in the art upon reviewing the above description. For example, implementations that include different numbers of sensors, monitors, controllers, recorders, alarms, and/or display devices, and different networks or means of communication interconnects, than those illustrated and described are intended to be included within the scope of the invention(s), as are additional functions and subsystems such as using wireless or Internet links to report critical sensor data and/or to alert property owners or pertinent authorities. The scope of various embodiments of the invention(s) includes any other applications in which the above structures and methods are used.

We claim:
1. A security system comprising:
   a. multiple cameras comprising at least a first camera and a second camera;
   b. a sensor monitoring system in communication with at least the first camera and the second camera, and configured to detect, using at least one image from at least the second camera, a potential security or safety threat to at least the first camera;
   c. a first hiding device in communication with the sensor monitoring system; and
   d. a first hiding structure in proximity to the first camera and comprising at least a portion of one of the group consisting of a natural object, a building, a hole in a wall, an item of building material, an item of statuary, a landscaping feature, and a decorative ornament;

wherein the sensor monitoring system is configured to direct the first hiding device to hide or disguise the first camera from the threat by moving the first camera and/or the first hiding structure in relation one to the other in response to the threat.

2. The security system of claim 1, further comprising at least one sensor that is not a camera and that is in communication with the sensor monitoring system;
 wherein the sensor is configured to send a signal to the sensor monitoring system when the sensor senses a condition indicative of a potential security or safety threat; and
 wherein the first hiding device and first hiding structure are configured to expose or hide the first camera in response at least in part to the signal.

3. The security system of claim 1, wherein the first hiding device is configured to move the first camera at least some of the time to at least a first position that at least momentarily hides the first camera from the detected potential security or safety threat.

4. The security system of claim 1, wherein the first hiding device is configured to move the first hiding structure at least some of the time to a second position that at least momentarily hides the first camera from the detected potential security or safety threat.

5. The security system of claim 1, wherein the first hiding device is configured to hide the first camera for a particular random duration of time.

6. The security system of claim 1, wherein the first hiding device is configured to expose the first camera for a particular random duration of time.

7. The security system of claim 1;
 wherein the first hiding device is configured to hide the first camera at least some of the time that the sensor monitoring system determines a potential security or safety threat is being sensed by at least one of the first camera and the second camera.

8. The security system of claim 1, further comprising a second hiding device and a second hiding structure;
 wherein the sensor monitoring system is further configured to direct the second hiding device to hide the second camera by moving the second camera and/or the second hiding structure in relation one to the other in response to another detected potential security or safety threat.

9. The security system of claim 1, wherein the first hiding structure comprises one or more objects not commonly related to cameras.

10. The security system of claim 1, further comprising a reporting device in communication with the sensor monitoring system;
 wherein the reporting device can be any of the group consisting of a visual display device, an audible emission device, a textual output device, and an alarm device.

11. A collection of at least a first camera and a second camera in communication with one another;
 wherein each of the first camera and the second camera is configured to detect one or more potential security or safety threats within its respective field-of-view;
 wherein each of the first camera and the second camera comprises a respective hiding device that can move that respective camera relative to an associated hiding structure; and
 wherein the first camera is configured to use its respective hiding device to hide that first camera behind its associated hiding structure whenever the second camera detects a first potential security or safety threat to the first camera.

12. The collection of claim 11, wherein the second camera is configured to pan or sweep in a manner that will at least some of the time cause its field-of-view to include the first camera.

13. The collection of claim 11, further comprising an additional sensor in communication with at least the first camera;
 wherein the additional sensor is configured to detect a second potential security or safety threat to the first camera and to send a signal to the first camera when the second potential security or safety threat is detected; and
 wherein the first camera is configured to hide after it receives that signal from the additional sensor.

14. A method of protecting cameras, the method comprising:
 a. providing a sensor monitoring system communicatively connected to at least two cameras and to at least two respective moving devices, wherein the sensor monitoring system is able to detect potential security or safety threats to one or more of the at least two cameras based on images communicated to it from one or more of the at least two cameras, and wherein the sensor monitoring system is able to cause the at least two moving devices to move their respective cameras to hide and/or disguise those respective cameras from one or more of the threats; and
 b. positioning at least one hiding structure to be adjacent to each of the at least two cameras such that the one hiding structure is used for hiding at least one of the two cameras.

15. The method of claim 14, further comprising setting up the two cameras such that their fields-of-view overlap at least in part at least some of the time.

16. The method of claim 14, wherein at least some times when at least one of the at least two cameras is moved to a hiding position, it is caused to remain in that hiding position for a particular random duration of time.

17. The method of claim 14, wherein at least some times when at least one of the at least two cameras is moved out of a hiding position, it is caused to remain out of that hiding position for a particular random duration of time.

18. The method of claim 14, wherein each of the at least two cameras is capable of detecting one or more objects or motions within its respective field-of-view, and wherein the one or more objects or motions represent(s) one or more of the potential security or safety threats.

19. The method of claim 14, wherein the sensor monitoring system uses images or video streams from at least one of the at least two cameras to detect objects or motions that represent one or more potential security or safety threats to at least one of the at least two cameras.

20. The method of claim 19, further comprising:
 a. providing a reporting device communicatively connected to the sensor monitoring system; and
 b. reporting on the reporting device information indicative of one or more potential security or safety threats against at least one of the at least two cameras.

* * * * *